July 13, 1965 C. C. AUEL 3,194,893

AUTOMATIC OPERATING DEVICE FOR PUSHBUTTON TELEPHONES

Filed April 7, 1961 2 Sheets-Sheet 1

INVENTOR.
CARL C. AUEL

BY [signature]

his ATTORNEY

July 13, 1965 C. C. AUEL 3,194,893

AUTOMATIC OPERATING DEVICE FOR PUSHBUTTON TELEPHONES

Filed April 7, 1961 2 Sheets-Sheet 2

INVENTOR.
CARL C. AUEL

BY T. H. Spencer his ATTORNEY 3,194,893
Patented July 13, 1965

3,194,893
AUTOMATIC OPERATING DEVICE FOR PUSHBUTTON TELEPHONES

Carl C. Auel, 1200 8th Ave., Irwin, Pa.

Filed Apr. 7, 1961, Ser. No. 101,547
5 Claims. (Cl. 179—90)

This invention relates to apparatus for automatically operating a pushbutton telephone, and more particularly to apparatus of the type described which is controlled by means of a punch card.

As is well known, a pushbutton telephone, unlike the conventional dial type, is provided with a plurality of pushbuttons each of which represents a digit or letter in a telephone number to be called. The pushbutton system is, of course, much faster than the dial arrangement in that a number may be reached by merely depressing the appropriate pushbuttons in sequence, thereby eliminating the delay time occasioned with a dial system each time the dial returns to its starting position following the dialing of a particular digit or letter in the number to be called.

In the past, automatic operating systems have been proposed for dial telephones wherein the numbers to be called are stored on punched cards, tapes or the like. In order to call a particular number, the corresponding punch card or other similar device was inserted into the apparatus which would then mechanically duplicate the conventional manual movements in dialing that number. Although systems of this type have the advantage of eliminating errors in dialing as well as the necessity for looking up a telephone number in the directory, they do not shorten the required dialing time and are usually extremely complicated in design and operation.

As an overall object, the present invention seeks to provide an automatic dialing system for pushbutton telephones which is extremely simple in both design and operation and which can be applied to a pushbutton telephone without any electrical connections or other fastening devices it being understood that the system may also be incorporated directly into the telephone set if desired.

Another object of the invention is to provide an automatic operating system for pushbutton telephones which will shorten the dialing time over and above that which can be achieved manually by the sequential depressing of those pushbuttons representing a number to be called. Thus, the present invention, unlike automatic systems for dial telephones, has the advantage of decreasing the required dialing time.

Still another object of the invention is to provide an automatic dialing system of the type described in which a punch card may be scanned to dial a preselected number by manually moving the card through stationary scanning apparatus.

In accordance with the invention, there is provided a plurality of electrical solenoid devices each of which is adapted when energized to depress a corresponding telephone pushbutton or to actuate other means for generating a signal representing indicia in a number to be called, electrical scanning apparatus for scanning a card having perforations therein representing indicia in a number to be called, and circuit means connecting the scanning apparatus to the solenoid devices whereby selected ones of the solenoid devices will be energized in sequence as the card is manually pulled through the scanning device to call the number which the perforations in the aforesaid card represent. Preferably, the scanning device comprises a stationary electrical conducting bar having a plurality of aligned electrical contacts resiliently biased into contact with one of its sides, the arrangement being such that when the card is pushed or pulled between the bar and contacts, selected ones of the contacts will sequentially register with corresponding perforations in the card. By connecting the contacts in a circuit arrangement whereby each contact may energize a corresponding solenoid when in engagement with said bar, and by providing switches engageable with the card which will permit current to flow between the bar and contacts only when a card is in the scanner and moved in one direction, selected ones of the solenoids will be energized as the card is moved in said one direction to call a number represented by the arrangement of the perforations in the card, and this achieved as rapidly as the card is moved through the scanner.

The above and other objects and features of the invention will become apparent from the following detailed description taken in connection with the accompanying drawings which form a part of this specification, and in which.

Figure 2:
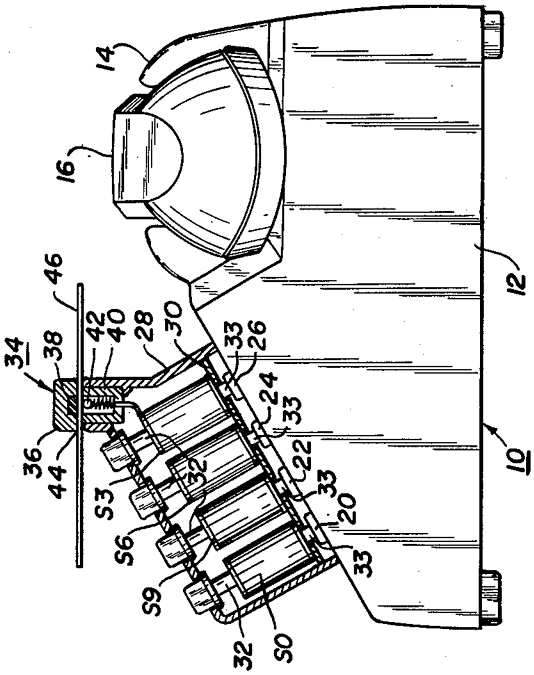
FIG. 2 is a side view of the telephone in FIG. 1 showing the automatic dialing device of the invention in cross section.
Figure 1:
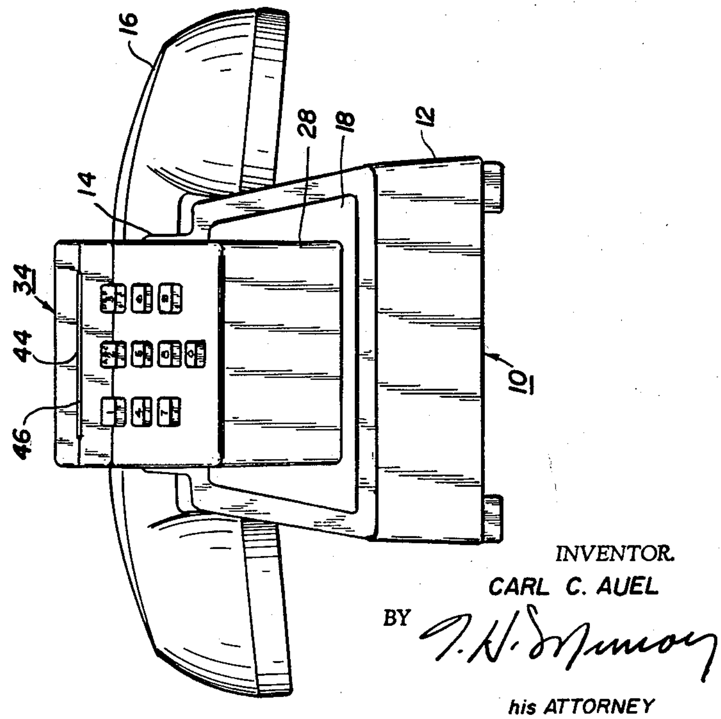
FIGURE 1 is an illustration of a pushbutton-type telephone having the automatic dialing apparatus of the invention applied thereto.

Referring now to the drawings, and particularly to FIGS. 1 and 2, the numeral 10 designates a pushbutton-type telephone having a base 12 provided with a cradle portion 14 which receives a handset 16. The pushbutton telephone, unlike the conventional dial type, is provided with a face area 18 having ten pushbuttons thereon, only four of said pushbuttons being shown in FIG. 2 and identified by the numerals 20, 22, 24 and 26. Each of the pushbuttons, when depressed, actuates a switch within the telephone to complete a circuit to effect the "dialing operation." As is known, in a conventional dial telephone, the first finger position on the dial designates the digit 1, the second finger position on the dial represents the digit 2 as well as the letters ABC, the third finger position represents the digit 3 as well as the letters DEF, and so on. Similarly, the ten pushbuttons on the face area 18 represent corresponding indicia. That is, the first button will designate the digit 1, the second button will designate the digit 2 as well as the letters ABC, etc. Thus, in order to call a particular number, selected ones of the pushbuttons are depressed in sequence in a manner similar to the operation of an adding machine or the like. Furthermore, a particular number may be "dialed" as quickly as the pushbuttons are depressed, thereby eliminating the delay time occasioned with a dial-type telephone each time the dial returns to its starting position following the dialing of a particular digit or letter in a telephone number.

In accordance with the present invention, the apparatus for automatically operating the pushbutton telephone includes an outer housing 28 which fits over the pushbuttons on the face area 18, substantially as shown. Preferably, a plastic or rubber adaptor plate, not shown, will be placed over the pushbuttons on face area 18 and this plate provided with means for properly positioning the housing 28 over the pushbuttons. The housing 28 is provided with a transversely-extending plate 30 at its lower portion, and this plate carries ten solenoids, each of which is arranged within housing 28 in alignment with a corresponding pushbutton on the face area 18. Only four of the solenoids are shown in FIG. 2 and identified as S0, S9, S6 and S3. Each of the solenoids within housing 28 is provided with the usual armature or plunger 32 having at its lower end a plastic or other similar semi-resilient tip 33 engaging a corresponding pushbutton on the face area 18, and at its upper end a second pushbutton, these pushbuttons being identified in FIG. 1 by the numerals 1–0. The tips 33 prevent marring or other damage to the pushbuttons on face area 18 and also serve to locate the metallic parts of the plungers in the most effective positions from an operating standpoint. Thus, by depressing any one of the pushbuttons connected to the upper ends of the armatures 32, the corresponding pushbutton on the face area 18 will also be depressed so that manual operation of the dial telephone may be effected even with the housing 28 positioned over the pushbuttons on face area 18. As is known, the pushbuttons on the face area are spring loaded, and this will normally serve to return the armatures 32 and the pushbuttons at the top of housing 28 to their starting positions after each pushbutton is depressed. If desired, however, coil springs or the like may be positioned around the armatures 32 between the pushbuttons at the top of the housing 28 and the solenoids.

Figure 3:
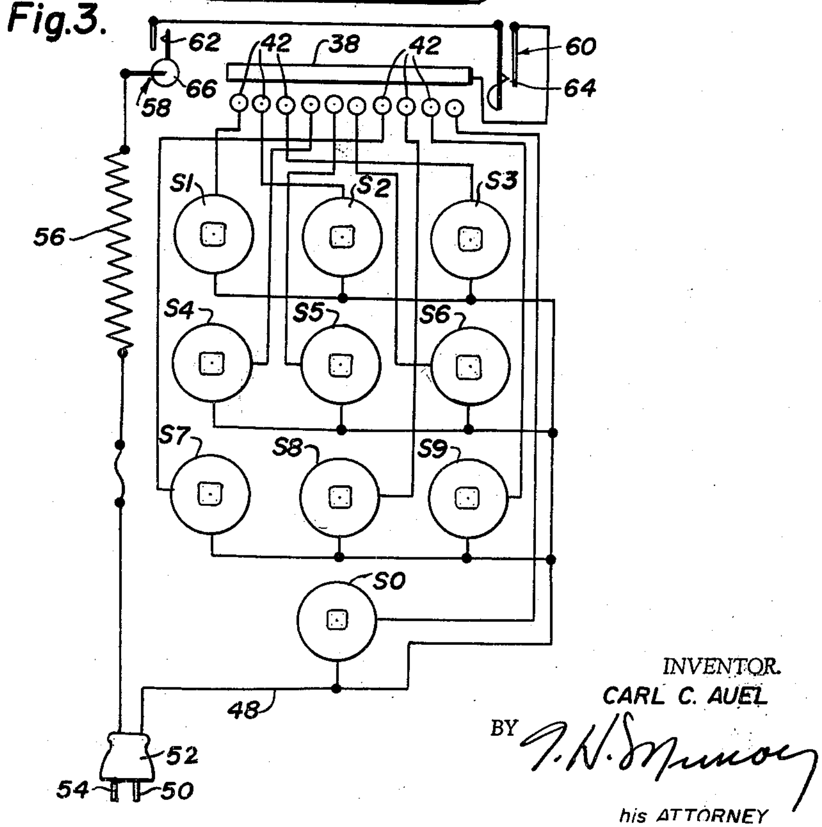
FIG. 3 is a schematic circuit diagram of the automatic operating device of the invention.

In order to effect automatic operation of the pushbutton telephone, apparatus including an electrical scanning device is provided on housing 28 and identified by the numeral 34. As is best shown in FIG. 2, the scanning device 34 comprises an upper section 36 which carries a bar 38 of electrical conducting material and a lower portion 40 which carries a plurality of spring-loaded electrical contacts 42 which, as will be seen in FIG. 3, are spaced across the length of the bar 38. Provided between the bar 38 and contacts 42 is a slot 44 which receives a perforated punch card 46.

As shown in FIG. 3, the contacts 42 are equally spaced along the length of bar 38; and each contact is connected to one end of an associated one of the solenoids S1–S0, the other ends of the solenoids being connected through a common lead 48 to one terminal 50 of a conventional plug 52 for a 110 volt alternating current wall socket, it being understood that a direct current voltage source could be used equally as well. The other terminal 54 of the socket 52 is connected through a resistor 56, flipover switch 58 and limit switch 60 to the bar 38. Switches 58 and 60 are provided with pairs of normally open contacts 62 and 64, respectively; and, consequently, the bar 38 will not be energized to complete a circuit through any one of the contacts 42 except when both of the switches 58 and 60 are closed. Switches 58 and 60 are spaced apart in an amount approximating the width of card 46; and, consequently, the limit switch 60 will be closed by the right edge or face of card 46 whenever that card is inserted into the slot 44 provided in the scanning device 34 shown in FIGS. 1 and 2. The flipover switch 58, on the other hand, is provided with a rubber or the like roller 66 which will engage the other or left edge or face of the card 46 when it is inserted into the slot 44. When the card 46 moves downwardly as shown in FIG. 3 (i.e., from right to left as shown in FIG. 2), its left edge or face, as the case may be, will tend to rotate the roller 66 in a clockwise direction, thereby maintaining the contacts 62 open. When, however, the card 46 is pulled out of the slot 44, its left edge will tend to rotate roller 66 in a counterclockwise direction, thereby closing the contacts 62 and completing a circuit to the bar 38.

Figure 4:
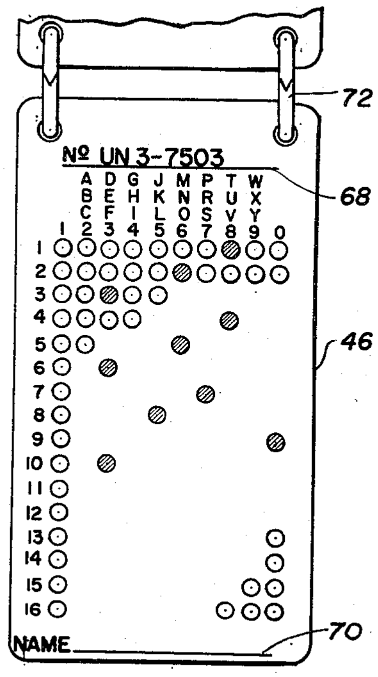
FIG. 4 is an illustration of a punch card of the type which may be used with the present invention to effect automatic operation of the pushbutton telephone.

As shown in FIG. 4, the card 46 is provided with a line 68 for the number to be called. In this case, we will assume that the number is UNderhill 3-7503. At the bottom of the card is a second line 70 provided for the name of the individual or concern whose telephone number is on line 68. In the example given, the card is provided with sixteen rows of circular partially pre-cut knockout holes, each row having ten knockout holes extending transversely across the width of the card in aligned columns. Any one of these holes may be punched out of the card with a pencil or other sharp instrument in a well-known manner to provide a perforation therein.

As shown, the columns of circular holes extending along the long transverse dimension of the card 46 (i.e., from top to bottom) are identified by the numerals 1–0 as well as appropriate letters identifying indicia in a telephone number to be called. Let us assume, for example, that the number to be called must be reached by long distance and that the long distance area code for that number is 412. Under these circumstances, the fourth hole in the first row, the first hole in the second row, and the second hole in the third row will be punched out, the resulting perforations being indicated by the hatched lines in FIG. 4. To complete the card, indicia representing the number UNderhill 3-7503 must be punched out of the fourth to tenth rows of holes. Thus, the eighth hole in the fourth row representing the letter U, the sixth hole in the fifth row representing the letter N, the third hole in the sixth row represening the digit 3, and so on will be punched out of the card 46 to provide the pattern of perforations shown by the hatched lines. The remaining rows of holes 11–16 may be used, if necessary, for additional codes or indicia for a particular number.

When the card is pushed into the slot 44, its left edge will engage the flipover switch 66 and maintain the contacts 62 open. However, when the card is pulled out of the slot 44, the contacts 62 will close. Now, when the perforations in the first row reaches the bar 38, the resiliently biased contact 42 for solenoid S4 will pass through the perforations and engage bar 38 to energize solenoid S4 and depress the number 4 pushbutton on the face area 18. Upon further movement of the card out of the slot 44, the perforation in the number 1 position of the second row will permit the contact 42 associated with solenoid S1 to engage bar 38 and energize this solenoid to depress the number 1 pushbutton on face area 18. Likewise, when the card is moved further out of the slot 44, the perforation in the third row will permit the contact 42 connected to the solenoid S2 to engage bar 38 whereby the number 2 pushbutton on the telephone will be depressed, and so on. In this manner, it can be seen that as the card 46 is pulled out of slot 44 a sequence of pushbuttons will be depressed representing the long distance area code as well as the number UNderhill 3–7503, and this accomplished as fast as the card is pulled out of the slot. If it is found that the operation of the pushbuttons is too fast for the central station telephone equipment, the rows of depressions may be spaced further apart to slow down the process in an obvious manner. Alternatively, a speed governing device could be used on the flipover switch 58.

In order to avoid the possibility of inserting the card into the slot 44 backwards, the distance between the 0 hole column and the right edge of the card is less than the distance between the 1 hole column and the left end of the card. Thus, if the card is turned over and inserted into the slot 44 backwards, the contacts 42 will not now register with the perforations provided in the card. That is, they will only register when the card is inserted into slot 44 in the correct manner with the wide margin on the left side of the card. As shown in FIG. 4, a plurality of such cards 46 may be stored on a ring binder 72 and a particular card merely flipped into position preparatory to dialing a specific number. In this respect, spacer cards providing an alphabetical index on one side of the stack of cards may be provided between each set of cards classified under a particular alphabetical letter.

Although the flipover switch 58 could alternatively be designed to close upon forward, rather than backward, movement of the card 46, the backward arrangement is preferable since this will also facilitate use of the card in an automatic operating mechanism for a dial-type telephone where the card must be scanned mechanically in a sequence of steps. That is, in a mechanical scanner of the type used for automatic operation of dial telephones, a scanning bar must be moved from one end of the card to the other, and if an attempt is made to scan from the back, rather than the forward edge of the card, the scanning bar will tend to push the card out of the scanning mechanism. However, by scanning from the front of the card as provided for in the present invention, the scanning bar will merely tend to push the card against a stop in the scanning mechanism, and no auxiliary holding devices for the card will be required.

The present invention thus provides a means for rapidly and efficiently operating a pushbutton-type telephone without requiring complicated and expensive mechanisms for accomplishing this function. Although the invention has been shown in connection with a certain specific embodiment, it will be readily apparent to those skilled in the art that various changes in form and arrangement of parts may be made to suit requirements without departing from the spirit and scope of the invention. In this respect, it is apparent that the solenoids S1–S0 may be incorporated directly into the telephone proper rather than in a housing which is placed over the pushbuttons on face area 18. Likewise, it is apparent that the solenoids could be eliminated entirely, and the scanner of the present invention simply connected in parallel with the button switches of the telephone proper, the idea being that the engagement of the contacts 42 with bar 38 would duplicate the switch closure action effected by manually depressing the buttons.

I claim as my invention:

1. In apparatus for automatically calling a preselected telephone number on a pushbutton-type telephone, the combination of a plurality of electrical solenoid devices each of which is adapted when energized to actuate a corresponding telephone pushbutton representing indicia in a number to be called, a stationary bar of electrical conducting material, a plurality of electrical contacts resiliently biased into engagement with one side of said bar, a card of electrical insulating material adapted to be manually pushed between the bar and said contacts, perforations in said card representing indicia in a number to be called and adapted to register with certain ones of said contacts to permit the contacts to engage the bar, circuit means including said bar and an associated one of said contacts for energizing each solenoid device when its associated contact engages the bar, and a pair of normally open switches in said circuit means which must close in order to energize any one of said solenoids, the first of said switches being such that it will close only when a card is between the bar and said contacts, and the second of said switches being such that it will close only upon movement of the card in one direction between the contacts and said bar.

2. In apparatus for automatically calling a preselected telephone number on a pushbutton-type telephone, the combination of a plurality of electrical solenoid devices each of which is adapted when energized to actuate a corresponding telephone pushbutton representing indicia in a number to be called, a stationary bar of electrical conducting material, a plurality of electrical contacts resiliently biased into engagement with one side of said bar, a card of electrical insulating material adapted to be manually pushed between the bar and said contacts, perforations in said card representing indicia in a number to be called and adapted to register with selected ones of said contacts, a pair of terminals adapted for connection to a source of voltage, first and second normally open switch devices adapted to connect one of said terminals to said bar, means connecting the other of said terminals to one end of each of said solenoid devices, means connecting the other end of each solenoid device to an associated one of said contacts, the first of said normally open switch devices being closed by the presence of a card between said bar and said contacts, and the second of said switch devices being closed upon movement of the card between the bar and the contacts in one direction only.

3. In apparatus for effecting switch closures in a pushbutton-type telephone to call a preselected telephone number, the combination of a stationary bar of electrical conducting material, a plurality of electrical contacts resiliently biased into engagement with one side of said bar, each of said electrical contacts representing indicia in a telephone number to be called, circuit means including said bar and said contacts for effecting switch closures representing indicia in a telephone number to be called, a card of electrical insulating material adapted to be manually pushed between the bar and said contacts, perforations in said card representing indicia in a number to be called and adapted to register with that contact representing the corresponding indicia, and a normally open switch in said circuit means which will close to effect switch closures only when a card is between the bar and said contacts and moved in one direction between the bar and contacts.

4. In apparatus for effecting switch closures in a pushbutton-type telephone to call a preselected telephone number, the combination of a stationary bar of electrical conducting material, a plurality of electrical contacts resiliently biased into engagement with one side of said bar, each of said contacts representing indicia in a telephone number to be called, circuit means including said bar and said contacts for effecting switch closures representing indicia in a telephone number to be called, a card of electrical insulating material adapted to be manually pushed between the bar and said contacts, perforations in said card representing indicia in a number to be called and adapted to register with selected ones of said contacts, and first and second normally open switch devices for energizing said circuit means, when both switch devices are closed the first of said normally open switch devices being closed by the presence of a card between said bar and said contacts, and the second of said switch devices being closed upon movement of the card between the bar and the contacts in one direction only.

5. In apparatus for effecting switch closures in a pushbutton-type telephone to call a preselected telephone number, the combination of a stationary bar of electrical conducting material, a plurality of electrical contacts resiliently biased into engagement with one side of said bar, each of said contacts representing indicia in a telephone number to be called, circuit means including said bar and said contacts for effecting switch closures representing indicia in a telephone number to be called, a card of electrical insulating material adapted to be manually pushed between the bar and said contacts, perforations in said card representing indicia in a number of to be called and adapted to register with selected ones of said contacts, and means including at least one normally open switch device for energizing said circuit means when said switch device is closed, said switch device being closed upon movement of the card between the bar and the contacts in one direction only.

References Cited by the Examiner

UNITED STATES PATENTS

| | | | |
|---|---|---|---|
| 2,044,470 | 6/36 | Devaux | 179—90 X |
| 2,297,772 | 10/42 | Johnson | 200—46 |
| 2,505,069 | 4/50 | Savino | 179—90 |
| 2,567,812 | 9/51 | Hickman | 179—90 |
| 3,038,967 | 6/62 | Andrews | 179—5 |

FOREIGN PATENTS

| | | |
|---|---|---|
| 160,685 | 3/33 | Switzerland. |

ROBERT H. ROSE, *Primary Examiner.*